(12) United States Patent
Derscheid

(10) Patent No.: US 6,810,653 B2
(45) Date of Patent: Nov. 2, 2004

(54) CROP PICK-UP ARRANGEMENT AND HEIGHT GAUGE ARRANGEMENT

(75) Inventor: Daniel Eric Derscheid, Gray (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/434,648

(22) Filed: May 9, 2003

(65) Prior Publication Data

US 2003/0213223 A1 Nov. 20, 2003

(30) Foreign Application Priority Data

May 16, 2002 (DE) .......................................... 102 21 735

(51) Int. Cl.⁷ .............................................. A01D 43/02
(52) U.S. Cl. ...................................................... 56/364
(58) Field of Search ................................ 172/310, 311, 172/669, 326–328; 56/341, 364, 228, 385

(56) References Cited

U.S. PATENT DOCUMENTS 2,414,823 A   12/1947   Luebben
6,152,240 A   11/2000   Nonhoff et al. ............. 172/311
6,244,027 B1   6/2001   McClure et al. .............. 56/364

FOREIGN PATENT DOCUMENTS

| BE | 511 048 | 5/1952 |
|----|---------|--------|
| DE | 40 00 918 | 8/1990 |
| DE | 299 17 991 U | 1/2000 |
| EP | 368 430 | 1/1990 |
| EP | A-383 121 | 2/1990 |
| EP | 0 383 121 | 8/1990 |
| FR | 1 309 095 A1 | 10/1962 |
| FR | 2 707 450 | 1/1995 |
| FR | 2 766 322 | 1/1999 |
| WO | WO-A1-98/17096 | 4/1998 |

*Primary Examiner*—Robert E Pezzuto

(57) ABSTRACT

A crop pick-up arrangement and height gauge arrangement is proposed in which, on the one hand, a skid shoe and on the other hand, a wheel are attached to a pivot arm assembly and can be pivoted about a horizontal transverse axis located between the skid shoe and the wheel. The skid shoe extends under the crop pick-up arrangement and therefore does not increase its width. Crop pick-up arrangements and height gauge arrangements may be used on various kinds of agricultural machines for lifting crop into the machines for further processing or transport.

10 Claims, 3 Drawing Sheets

CROP PICK-UP ARRANGEMENT AND HEIGHT GAUGE ARRANGEMENT

FIELD OF THE INVENTION

The invention concerns a crop pick-up arrangement with a height gauge arrangement with a pivot arm assembly that is supported in bearings so as to pivot vertically at the rear region of the crop pick-up arrangement and a height gauge arrangement.

BACKGROUND OF THE INVENTION

U.S. Pat. No. 6,152,240 discloses a crop pick-up arrangement with support wheels, each of which is attached by means of a pivot arm assembly to a side wall. The pivot arm assembly is retained by means of a vertical and a horizontal bearing and can be pivoted vertically as well as horizontally in such a way that the support wheel can be pivoted in a free space behind the crop pick-up arrangement in order to reduce its transport width.

WO-A1-98/17096 teaches the attachment of a support wheel at each side of a so-called pick-up by means of a pivot arm assembly that is configured in the shape of an inverted "U". The size, shape, and arrangement of the pivot arm assembly is selected in such a way that a large free space exists between the wheel and the pick-up which prevents harvested crop from accumulating there.

EP-A-383 121 and EP-368 430 each show an agricultural harvesting machine with a roller feeler arrangement where on each side of a crop pick-up arrangement several roller feelers are attached to a pivot arm assembly spaced at intervals in direction of operation in a tandem or dual swinging arrangement.

The problem underlying the invention is seen in the fact that the roller feelers must either be pivoted at great technical cost or disassembled during transport on public roads due to the great width of the crop pick-up arrangement.

SUMMARY OF THE INVENTION

According to the present invention there is provided an improved height gauge arrangement for a crop pick-up or the like.

An object of the invention is to provide a height gauge arrangement that includes a combination of a gauge wheel and a skid shoe.

Another object of the invention is to provide a height gauge arrangement for use with a crop pick-up including pick-up devices such as transversely spaced tines, with the skid shoe being narrower than the spacing between the pick-up devices. In this way, the pivot arm assembly for the skid shoe can be located within the effective width of the crop pick-up arrangement and can be supported on the ground so that the skid shoe has room between the pick-up devices of the crop pick-up arrangement or between these and the ground. Accordingly, the skid shoe can extend into the pick-up region of the crop pick-up arrangement and thereby react before these come into contact with an obstacle or an irregularity in the ground. Since the pivot arm assembly is supported on the wheel at the end opposite the skid shoe and thereby forms a lever arm about a bearing located in between, the lift path is reduced.

If the skid shoe is narrower than the spacing between the pick-up devices of the crop pick-up arrangement, it can extend between these, does not hinder these, and can be configured to almost such a height as the pick-up devices project beyond the stripper vanes of the crop pick-up arrangement.

A plate-shaped skid shoe can be arranged underneath the pick-up devices due to its flat configuration and thereby can be configured considerably wider, which results in a low ground pressure. Vertical stiffening frames and ribs can be provided between the pick-up devices that protect the skid shoe against bending.

The position of the pivot point of the pivot arm assembly on the wheel, generally underneath the point at which the crop pick-up arrangement is attached to a rotobaler or a similar harvesting or crop recovery machine, leads to an adequate sensitivity when uneven ground is encountered on the one hand, and on the other hand, excessively strong reactions are avoided.

If several skid shoes are provided, for example, three to ten, the ground pressure of each individual skid shoe is reduced on the one hand, and on the other hand, the likelihood is reduced so that there is no reaction to an obstacle. Several skid shoes can be connected to the pivot arm assembly by means of a sort of balance arrangement or equalization arrangement so that the pivot arm assembly is actuated only if an obstacle is detected, for example, by two adjacent skid shoes. In this way, the possibility is also avoided that the crop pick-up arrangement is lowered, if the skid shoe, for example, sinks into a furrow.

The skid shoes and the wheels and possibly even the wheels of the machine to which the crop pick-up arrangement is attached could be arranged in one alignment; but this is not mandatory. Rather, an offset arrangement of the skid shoes and wheels can have the result, for example, in case a skid shoe steps into a furrow, then the wheel rolling to the side of the furrow can provide at least a minimum of support. Furthermore, in this way the spacial relationships of the configuration can be considered. A pivot shaft provided for this purpose extends over the crop pick-up arrangement so far as is required in order to engage all skid shoes and wheels.

An elastic configuration of the pivot arm assembly, for example, that is composed of an elastic material or that is composed of several parts or arms connected to each other elastically, has the advantage that load peaks, particularly at high contact velocities, can be avoided. On the other hand, load peaks can also be avoided by the provision of a spring of any desired type between the skid shoe or the wheel and the pivot arm assembly.

Rounded edges on the skid shoe reduce the danger of harvested crop or other objects becoming caught on the skid shoe during skidding over the ground and accumulating there. Particularly, the frictional resistance is reduced during the skidding over the ground.

A preload of the pivot arm assembly, relative to the crop pick-up arrangement, is established in such a way, that with the skid shoe located at the underside of the crop pick-up arrangement, there is the advantage that the skid shoe does not dig into the ground upon the lowering of the crop pick-up arrangement and is thereby possibly damaged; rather, the wheel is forced downward thereby so that it first touches the ground upon the lowering of the crop pick-up arrangement and then rolls along the ground, without experiencing any problems. If, in another embodiment, the preload operates in such a way that the wheel is pivoted upwards, this may have advantages during transportation over public roads, since the wheel comes to rest at a lower position than the skid shoe does when the crop pick-up arrangement is pivoted upward. In summary, the preload is applied in such a way and at such locations where it is useful in order to avoid the damage due to an uncontrolled movement of the pivot arm assembly.

The use of at least one stop in the one, the other or in both directions, prevents the pivot arm assembly with the skid shoe and the wheel from being pivoted too far away from the crop pick-up arrangement, and then projects so far that it could be a hindrance or hangs up during transport or in the operation.

Height gauge arrangements with the aforementioned characteristics can also be treated as independent units and can be attached subsequently to existing crop pick-up arrangements. Particularly, with rotobalers, rectangular balers, self-loading forage boxes, forage harvesters, swath pick-up arrangements, and the like, it is then possible to use crop pick-up arrangements, whose possible pick-up width corresponds generally to the maximum allowable transport width on public roads.

BRIEF DESCRIPTION OF THE DRAWINGS

The drawing shows an embodiment of the invention that shall be described in greater detail in the following.

DESCRIPTION OF THE PREFERRED EMBODIMENT

Figure 1:
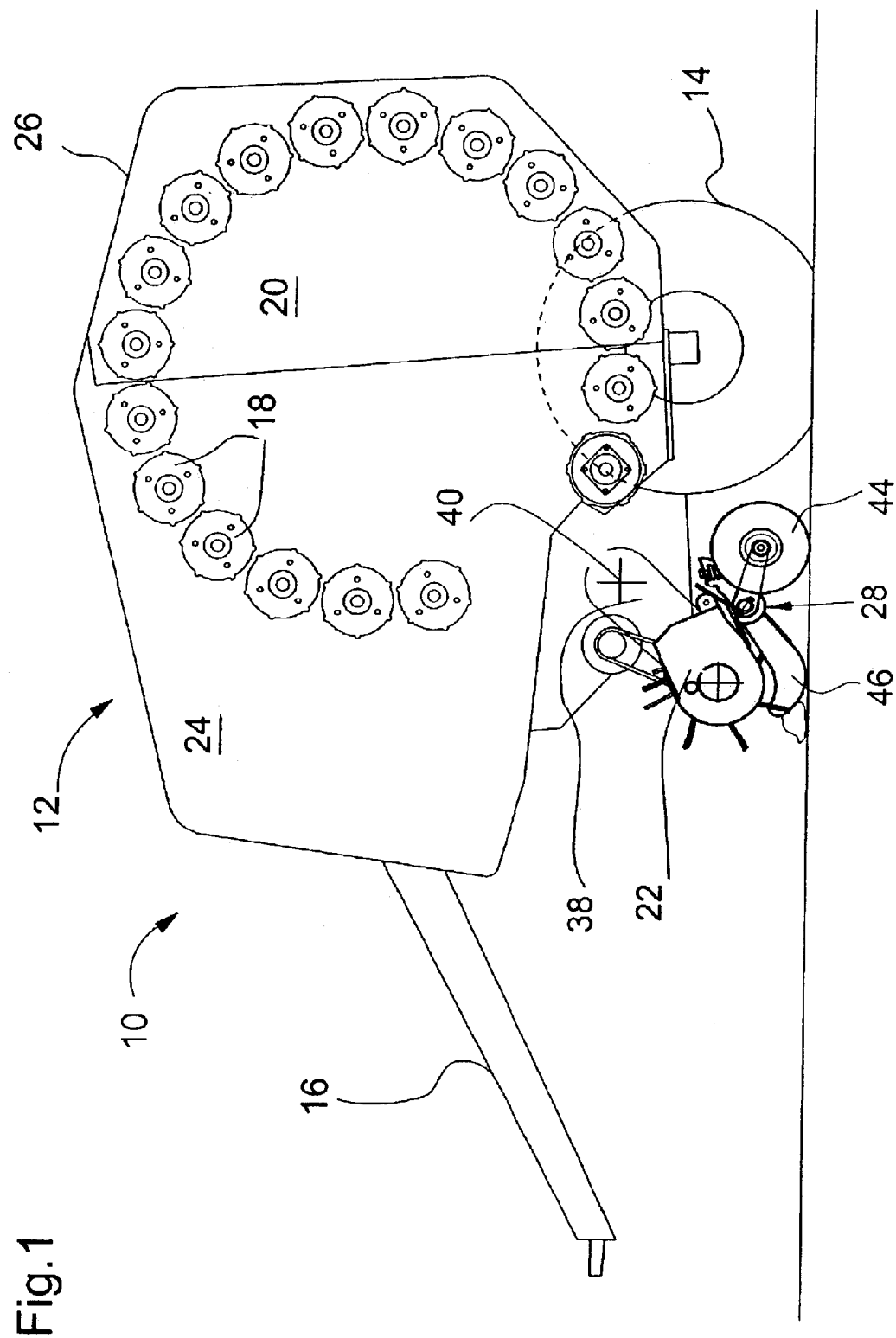
FIG. 1 is a schematic, left side view of an agricultural machine with a crop pick-up arrangement and a height gauge arrangement constructed according to the invention.

Referring now to FIG. 1, there is shown an agricultural harvesting machine 10 with a frame 12 that is supported by wheels 14 on the ground and can be coupled to a towing vehicle by means of a towbar 16. Baling rolls 18 surround a baling chamber 20 in which crop to be baled, which was taken up from the ground by a crop pick-up arrangement 22, can be compressed into a bale. The baling chamber 20 extends through a forward, fixed housing part 24 and a rear housing part 26, forming a discharge gate that can be raised for the ejection of a cylindrical bale.

On each side of the crop pick-up arrangement 22, a height gauge arrangement 28 is located, with which the crop pick-up arrangement 22 can be gauged at a certain height above the ground.

The agricultural machine 10 described so far corresponds to a rotobaler of conventional configuration. Indeed, the use of the height gauge arrangement 28 according to the invention is limited neither to a rotobaler of the type shown nor to a rotobaler at all. Rather, other agricultural machines can be considered, for example, another baler, a self-loading forage box, a forage harvester, a combine, and the like.

The crop pick-up arrangement 22 may be a pick-up as well as a cutter head, a corn head or the like, and can extend over the maximum width allowed for the transport on public roads. As can be seen, in particular in FIG. 2, the crop pick-up arrangement 22 includes tines 30 circulating vertically in horizontally spaced rows that leave a spacing 32 between them that is covered by stripper vanes 34. The tines 30 and the stripper vanes 34 are carried by a frame 36 to a rear side of which is fixed a pair of transversely spaced rear walls 38 that extend vertically beside walls of the frame 12 and contain a bearing 40 to which the frame 36 is coupled so as to pivot vertically. The bearing 40 is located above and to the rear of the frame 36, but ahead of the support wheels 14. The crop pick-up arrangement 22 can be repositioned in height by means of actuating arrangements, not shown, for example, linkages, rope pulls, hydraulic motors, etc., in order to occupy thereby an upper transport position or to slide along the ground for crop pick-up. In the lower crop pick-up position, the crop pick-up arrangement 22 can float according to the surface of the ground. Other than for the height gauge arrangement 28, the crop pick-up arrangement 22 is of conventional configuration.

The height gauge arrangement 28 includes a pivot arm assembly 42, wheels 44, skid shoes 46, a pivot shaft 48, and a bearing 50.

In the disclosed embodiment, the height gauge arrangement 22 is configured as an assembly that is attached to the underside of the crop pick-up arrangement 22 and extends almost or generally over its entire width. Indeed, it would also be possible to configure it in each case with only one component (pivot arm assembly 42, wheel 44, skid shoe 46, pivot shaft 48, and bearing 50) and to locate the narrower assembly at a location between opposite ends of the crop pick-up arrangement 22.

While in the disclosed embodiment two wheels 44 and three skid shoes 46 are provided, fundamentally one wheel 44 and one skid shoe 46 would be adequate. On the other hand, more than two wheels 44 and three skid shoes 46 could be provided, as long as this is practical and technically useful.

Compared to the support wheels 14, each wheel 44 is of a relatively small diameter and is used for supporting the pivot arm assembly 42 on the ground, when the skid shoes 46 encounter an obstacle. The wheels 44 are located to the rear of the pivot shaft 48, or as seen in FIG. 1, to the right of the shaft 48. Each wheel 44 is engaged, free to rotate in an end region of an arm 52, whose other end region is retained radially to the pivot shaft 48. The wheels 44 may be provided with solid or pneumatic tires. In a simple configuration, the arms 52 may be retained and fixed against rotation on the pivot shaft 48. In the embodiment shown, however, they are supported in bearings on the shaft 48, free to pivot.

Figure 2:
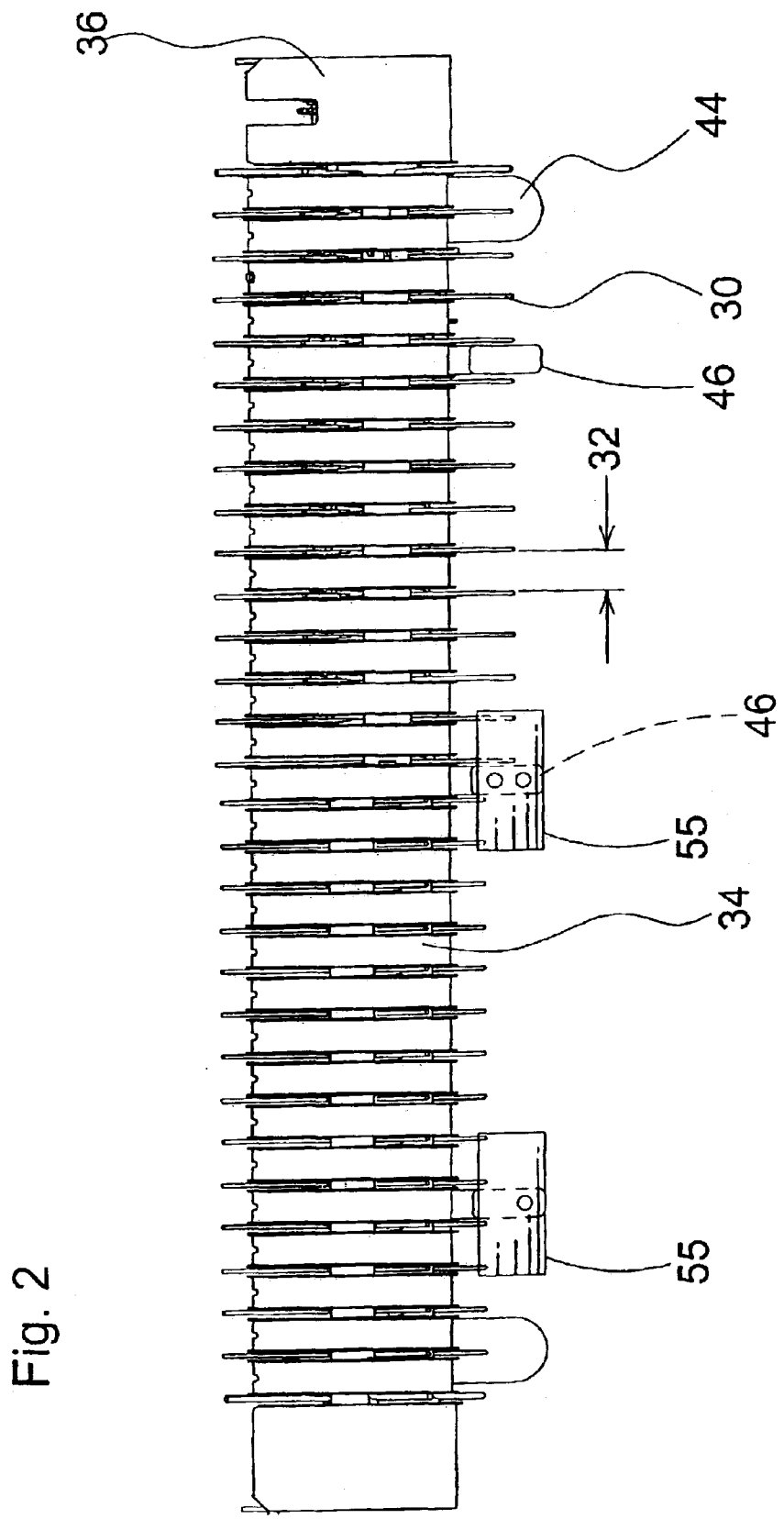
FIG. 2 is a front view of the crop pick-up arrangement of FIG. 1.

The skid shoes 46 also extend radially from the pivot shaft 48 and are connected to it, fixed against rotation. Although the skid shoes 46 are shown, according to FIG. 3, connected directly to the pivot shaft 48, the description in the following nevertheless is based on the fact that only the forward region shows a skid shoe 46 that is connected by an arm 54 with the pivot shaft 48 or that extends to it. As seen in FIG. 2, the right-hand skid shoe 46 is also configured in such a way that it fits between the tines 30, and in the extreme case, can be brought into contact with the underside of the stripper vanes 34, without colliding with the tines 30. On the other hand, it would also be possible to releasably attach wider plates 55 to the underside of the skid shoes 46, as shown at the middle and left-hand skid shoes 46, which plates 55 extend outside of the operating region of the tines 30. The plates 55 act to minimize the ground pressure. Furthermore, the removable plates 55 have the advantage that they could easily be replaced in case of wear or damage. Alternatively, the skid shoes 46 in themselves could be configured in the shape of a plate. In a further embodiment, in place of fixed skid surfaces, rolls, wheels or the like could also be used. At the end opposite the skid shoe 46, each arm 54 extends beyond the pivot shaft 48 and forms a support arm 55 that extends in the form of a scissors to the arm 52.

The pivot shaft 48 is preferably provided with a non-circular profile, for example, hexagonal, and extends preferably over the entire width of the height gauge arrangement 28. Alternatively, each wheel 44 could be connected with one or several skid shoes 46. The pivot shaft 48 engages, so as to-rotate, at the rear lower corner region of the crop pick-up arrangement 22 by means of the bearings 50 and is secured in the axial direction by means not shown.

A spring 56 is provided between the shaft 48 and the frame 36 of the crop pick-up arrangement 22, which constantly resists counterclockwise movement of the shaft 48 and hence, downward movement of the skid shoe 46, so that particularly when the crop pick-up arrangement 22 is raised, the skid shoes 46 do not project downward and collide with an obstacle, without being able to evade it, while a contact of the wheel 44, then located at the bottom and able to move upward, leaves it undamaged.

While the spring 56 is shown in the drawing as a torsion spring, a multitude of other springs could also be used, for example, leaf springs, helical compression springs, helical extension springs or even gas springs or the like. The spring 56 is retained at one end by means of an eye (not shown) and a screw 57 received in a bore provided in the shaft 48, and is in contact at its other end under a preload at the rear, lower edge of the frame 36, which indeed could also be configured differently.

The bearings 50 are configured in the usual manner as slide bearings, roller bearings or ball bearings that are fastened in bearing shells 51 on the underside of the frame 36.

The spring 56 or several springs 56 are particularly useful to retain the skid shoes 46 generally upward in addition to the pivoting moments about the pivot shaft 48 due to the weight of the associated masses upon very uneven ground.

Figure 3:
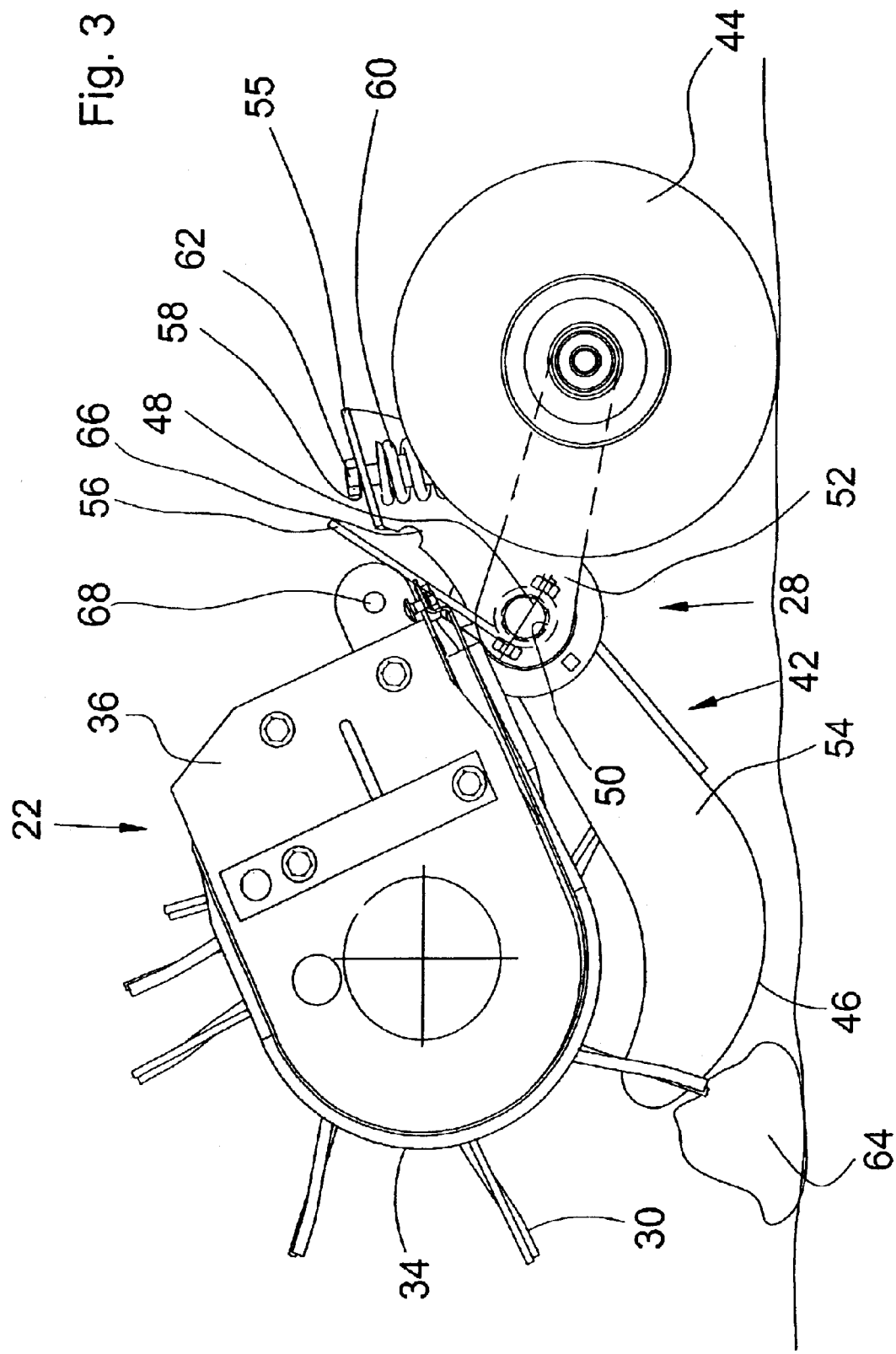
FIG. 3 shows an enlarged side view of the height gauge arrangement and the crop pick-up arrangement of FIG. 1.

The arms 52 for the wheels 44 are formed more or less from a flat steel strip with high bending strength. The arms 54 for the skid shoes 46 are configured comparably to the arms 52. If the arms 54 simultaneously form the skid shoes 46, they can be configured in a "J"-shape, as is shown in FIG. 3, so that they can slide along the ground on the outer bend of the "J" instead of on its edge.

The arms 52 and 54 can extend on the pivot shaft 48 immediately alongside each other, or spaced to the side alongside each other. In another embodiment, they can also be combined and configured as a one-piece component. In the embodiment shown, their longitudinal axes extend at an angle between them of approximately 140°. Since the arm 52 of the wheel 44 is supported in bearings, free to move on the pivot shaft 48, the relative position between the arms 52 and 54 is maintained by means of a very strong spring 60 configured as a helical compression spring that can engage with one end the support arm 55 and with its other end on the upper side of the arm 52. A screw 62 extends through the spring 60 and is secured in the support arm 55 as well as in the arm 52, and is used to retain the spring 60 in its place as well as to maintain the angular spread between the arms 52 and 54 at a minimum. Accordingly, the spring 60 on the one hand and the screw 62 on the other hand provide the assurance that the two arms 52 and 54 can be repositioned relative to each other within a certain region under a preload.

A depression 66, which is semi-circular in side view, is provided on the upper side of the arm 52 in a location for receiving a stop 68, carried by the frame 36 when the pivot arm assembly 42 pivots to an extreme counterclockwise position. The stop 68 can be configured as a screw, a pin, a welded part or the like and can be attached to the frame 36 rigidly or so that it can be repositioned. The depression 66 and the stop 68 are located on a circular arc about the center of the pivot shaft 48.

On the basis of the above description, the operation is as follows: During operation, the crop pick-up arrangement 22 and the height gauge arrangement 28 take the position shown in FIG. 3, in which the pick-up devices 30 brush over the ground, and the skid shoes 46, as well as the wheels 44, touch the ground. If the crop pick-up arrangement 22 is moved to the left as seen in FIG. 3, that is, forward, and if a skid shoe 46 makes contact with an obstacle 64, then the crop pick-up arrangement 22 moves upward. Thereupon, a pivoting movement of the pivot arm assembly 42, together with the pivot shaft 48, is performed in the clockwise direction. Since the wheel 44 is located on the ground and held there by the action of the coil compression spring 60, the crop pick-up arrangement 22 is raised in the region of the pivot shaft 48. As soon as the obstacle has been overcome, the skid shoe 46 is lowered again; and with it, the crop pick-up arrangement 22 is also lowered. In an embodiment in which the wheel 44 is offset to the side with respect to the skid shoe 46, the wheel 44 will not also roll over the obstacle 64 and will not lead to a renewed raising of the crop pick-up arrangement 22.

Having described the preferred embodiment, it will become apparent that various modifications can be made without departing from the scope of the invention as defined in the accompanying claims.

What is claimed is:

1. In combination with a crop pick-up arrangement including a main frame, a height gauge arrangement, comprising: a pivot arm assembly supported in bearings so as to pivot vertically about a horizontal transverse pivot axis located at a lower rear region of said main frame of the crop pick-up arrangement in a zone inward of opposite ends of said main frame; said pivot arm assembly including at least one pivot arm arrangement extending fore-and-aft in a direction of travel of said pick-up arrangement; at least one wheel being mounted on said at least one pivot arm arrangement at a first end region located on an opposite side of said pivot axis from said crop pick-up arrangement; and at least one skid shoe mounted to said pivot arm assembly at a second end region located directly beneath said crop pick-up arrangement.

2. The combination, as defined in claim 1, wherein said pick-up arrangement includes a plurality of pick-up devices mounted in transversely spaced rows across a width of said pick-up arrangement; and said at least one skid shoe being narrower than the spacing between, and being located between an adjacent pair of said rows of pick-up devices.

3. The combination, as defined in claim 1, wherein said at least one skid shoe of said pick-up is configured in the shape of a plate and extends over several rows of said pick-up devices of said crop pick-up arrangement; and said skid shoe being mounted to said at least one arm arrangement so as to not interfere with said several rows of said pick-up devices.

4. The combination, as defined in claim 1, wherein said main frame is fixed to supporting structure adapted for mounting said main frame to an agricultural machine for pivoting about a second horizontal transverse axis located at a region located approximately vertically above a center of rotation of said wheel.

5. The combination, as defined in claim 1, wherein said height gauge arrangement includes several skid shoes that are provided at transversely spaced locations over the width of said crop pick-up arrangement.

6. The combination, as defined in claim 1, wherein said at least one skid shoe is transversely offset relative to said at least one wheel, whereby said at least one skid shoe will travel a different longitudinal path than said wheel during operation of said pick-up arrangement.

7. The combination, as defined in claim 1, wherein said at least one pivot arm arrangement of said pivot arm assembly includes a first arm having said at least one skid shoe located at forward region thereof; a second arm having said at least one wheel located at a rear region thereof; and a yieldable biasing arrangement associated with said first and second arms for yieldably resisting upward movement of both said at least one skid shoe and said at least one wheel.

8. The combination, as defined in claim 1, wherein said at least one arm arrangement includes an arm member projecting forwardly from said horizontal transverse axis; and said at least one skid shoe is formed as rounded forward end of said arm member.

9. The combination, as defined in claim 1 wherein said pivot arm assembly is coupled to a transverse pivot shaft mounted to said main frame for pivoting about said a horizontal, transverse axis; and a preload device mounted for acting between said main frame and said transverse pivot shaft for yieldably resisting movement of said pivot shaft in a counterclockwise direction about said transverse axis, as viewed looking towards its left-hand end, whereby said at least one skid shoe is prevented from moving down away from the pick-up arrangement when the latter is raised relative to the ground.

10. The combination, as defined in claim 9, and further including a stop for limiting movement of said pivot arm assembly in said counterclockwise direction about said transverse axis.

* * * * *